(12) United States Patent
Keirse

(10) Patent No.: US 8,347,816 B2
(45) Date of Patent: Jan. 8, 2013

(54) FEED DISPENSER WITH A WEAR-RESISTANT PECKING AREA FOR FEEDING BIRDS

(75) Inventor: Philippe Hyppoliet Pia Maria Keirse, Maldegem (BE)

(73) Assignee: Roxell N.V., Maldegem (BE)

(*) Notice: Subject to any disclaimer, the term of this patent is extended or adjusted under 35 U.S.C. 154(b) by 77 days.

(21) Appl. No.: 12/673,016

(22) PCT Filed: Jul. 29, 2008

(86) PCT No.: PCT/IB2008/001970
§ 371 (c)(1),
(2), (4) Date: Feb. 11, 2010

(87) PCT Pub. No.: WO2009/024845
PCT Pub. Date: Feb. 26, 2009

(65) Prior Publication Data
US 2011/0094447 A1    Apr. 28, 2011

(30) Foreign Application Priority Data
Aug. 21, 2007  (NL) .................................. 1034272

(51) Int. Cl.
*A01K 39/00* (2006.01)
(52) U.S. Cl. ...................................... 119/52.1
(58) Field of Classification Search .............. 119/52.1, 119/52.2, 52.4, 57.8, 61.5, 51.01, 61.1, 429; 220/62.22
See application file for complete search history.

(56) References Cited

U.S. PATENT DOCUMENTS

| 1,772,843 | A | * | 8/1930 | Rickey et al. | 119/52.4 |
| 4,800,845 | A | * | 1/1989 | Budd | 119/61.5 |
| 5,235,934 | A |   | 8/1993 | Runion |  |
| 5,901,886 | A | * | 5/1999 | Grindstaff et al. | 222/557 |
| 6,763,962 | B1 | * | 7/2004 | Wang | 220/62.12 |

FOREIGN PATENT DOCUMENTS
DE            20212008         1/2003

OTHER PUBLICATIONS
Search Report dated Mar. 3, 2008 for NL 1034272.
PCT Search Report dated Dec. 8, 2008.

\* cited by examiner

*Primary Examiner* — Kristen C Hayes
(74) *Attorney, Agent, or Firm* — Thomas|Horstemeyer, LLP

(57) ABSTRACT

The invention relates to a feed dispenser for birds with a wear-resistant pecking area. This feed dispenser comprises a dispensing pan with a raised mid-section, that is surrounded entirely by a base plate. This base plate is built up of a plastic base material and a substantially impenetrable contiguous layer of material that is more wear-resistant than the plastic base material, for example a more wear-resistant plastic or metal. This achieves the advantage that the base plate is protected from perforation by the birds' beaks.

17 Claims, 6 Drawing Sheets

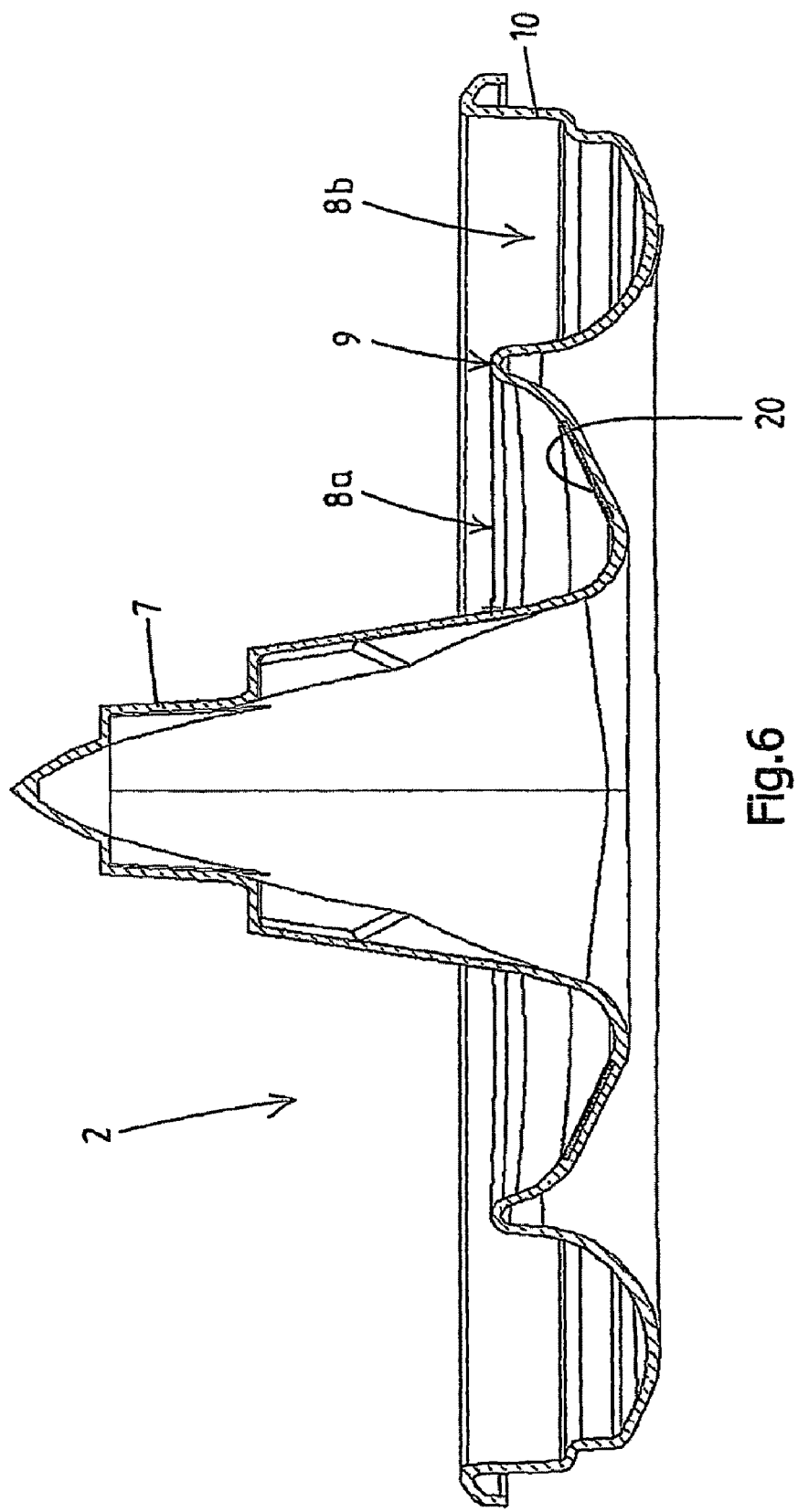

FEED DISPENSER WITH A WEAR-RESISTANT PECKING AREA FOR FEEDING BIRDS

CROSS-REFERENCE TO RELATED APPLICATION

This application is the National Stage of International Application no. PCT/IB2008/001970 filed Jul. 29, 2008, which claims the benefit of Netherlands patent application number 1034272 filed Aug. 21, 2007, the contents of which are incorporated by reference as fully set forth herein.

FIELD OF THE INVENTION

The invention relates to a feed dispenser for birds with a wear-resistant pecking area.

BACKGROUND

Some poultry species are subjected to a feed restriction period during a specific part of their life cycle. During this restriction period the animals receive little feed, and feel very hungry. In addition, they have a continual opportunity to peck in their feeder pan. Consequently, although there is little or no feed in the feeder pans the birds continually peck in the pans. Moreover a continually decreasing number of countries permit beak cauterization or trimming of commercial poultry, a prohibition introduced in connection with animal welfare. Consequently the animal's beak remains razor-sharp throughout the life cycle. As a result feeder pans constructed from cheaper types of plastic exhibit wear over the course of time, and can even be perforated by the birds' beaks.

It is already known that wear of this nature can be avoided by providing the pecking area in the feeder pan with another wear-resistant material. For example, U.S. Pat. No. 5,235,934 shows an abrasive surface provided on the feeding surface of a feeder pan. As a result the birds' beaks are automatically abraded and trimmed as they feed. The abrasive surface is obtained by bonding small abrasive particles directly to the surface. In a variant these adhesive particles are bonded to a carrier, such as film, which is in turn adhered to the feeding surface of the feeder pan.

One drawback of this is the adhering of the abrasive particles to the feeder pans, since these are usually manufactured from polypropylene, a type of plastic that is non-glueable. A further drawback can be that the granular structure of the abrasive particles determines the rate at which the beaks abrade. This can be too fast, or too slow. In addition, there is a risk that some of the abrasive particles may become loose, as a result of which they may enter the feed and, consequently, the birds' stomachs. This will then, in particular, occur during the aforementioned feed-restriction period in which the birds often peck in the feeder pans. The local loss of the abrasive particles will immediately result in weak points that are susceptible to wear, and the feeder pan may even be perforated by the birds' beaks at these points. This risk of perforation by the birds' beaks is also present at the small gaps between the abrasive particles.

SUMMARY

The object of this invention is to at least mitigate these drawbacks or provide a practicable alternative. In particular, the object of this invention is to provide an animal-friendly feed dispenser with a long serviceable life.

This object is achieved by a feed dispenser of the present disclosure. This feed dispenser comprises a dispensing pan with a raised central mid-section entirely surrounded by a base plate. This base plate is built up of a plastic base material and a substantially impenetrable continuous layer of material that is more wear-resistant than the plastic base material, for example a more wear-resistant plastic or metal. This achieves the advantage that the base plate is protected from perforation by the birds' beaks. A cheaper plastic can now be chosen for the plastic base material without immediately resulting in a critical weakening of the feed dispenser. In general, the resistance to wear may be expressed in a unit according to a standardized procedure. This may, for example, be determined by rolling a hard wheel over the surface to be measured and quantifying the wear. A method is also possible in which a mechanical simulation of a bird's pecking beak is used on a piece of the pan. However, preference is given to a method for the evaluation of the wear-resistance of a material to perforation caused by birds' beaks using a field test with real animals.

The impenetrable and substantially continuous layer is preferably formed by a uniformly built-up layer and/or integrally-formed layer that possesses the aforementioned more wear-resistant properties on its entire surface. This layer may be formed from one part, when it is manufactured from just one material. However, the layer may also be formed from several parts. The layer may, for example, be a reinforced layer comprised, for example, of a plastic reinforced with fibres. It is also possible that particles are added to the layer, for example (glass) fibre, (glass) spheres, or (metal) granules. These particles may then be introduced via an injection-moulding process, or may be an integral part of the layer.

In a special embodiment the continuous layer comprises a wear-resistant material with a smooth surface. This keeps the feeder pan hygienic, is cheap to manufacture, and makes the layer less vulnerable. As a result of the local reinforcement it is no longer necessary to arrange for the abrasion of the birds' beaks. However, in a variant it is also possible that the layer of more wear-resistant material is provided with a rougher, if so required abrasive, surface structure.

In a preferred embodiment the impenetrable and substantially continuous layer of a wear-resistant material is joined to the plastic base material during an injection-moulding process. This results in a reliable joint, and can readily be integrated in the current manufacturing process. For example, when a prefabricated element is used as the impenetrable and substantially continuous layer then this element can be placed in a forming mould, and the plastic base material injected. When using this method it is even possible that the injection pressure of the plastic base material is used to form the element into the required profiled shape. This can be a particular advantage when a ductile metal element is used.

In a further embodiment the impenetrable and substantially continuous layer may comprise a plastic material which is harder and/or tougher than the plastic base material. However, a plastic material that is less hard and/or tough than the plastic base material is also possible. This material may, for example, comprise polyurethane. The second plastic material may then be placed as a prefabricated element in a forming mould, and the plastic base material injection-moulded. It is also possible that the second plastic material is injection-moulded onto the previously injection-moulded plastic base material, or that the plastic base material is injection-moulded onto the previously injection-moulded second plastic material.

The impenetrable and substantially continuous layer is preferably provided solely to the location of the intended pecking area of the feeder pan, by which it is meant solely that part of the bottom section covered with feed when feed is supplied via the drop tube. This will usually be that part of the base plate that is continuous with and entirely surrounds the raised mid-section of the dispensing pan and drop tube respectively.

Further preferred embodiments are defined in the Detailed Description below and in the following claims.

The invention also relates to a method for the manufacture of a dispensing pan for a feed dispenser including a base plate built up from a plastic base material, wherein an impenetrable and substantially continuous layer is joined to the plastic base material by an injection-molding process.

BRIEF DESCRIPTION OF THE DRAWINGS

Hereinafter the invention is explained in more detail on the basis of the following drawings, in which:

FIG. 6 is a diagrammatic elevation in cross-section of FIG. 5.

DETAILED DESCRIPTION

Figure 1:
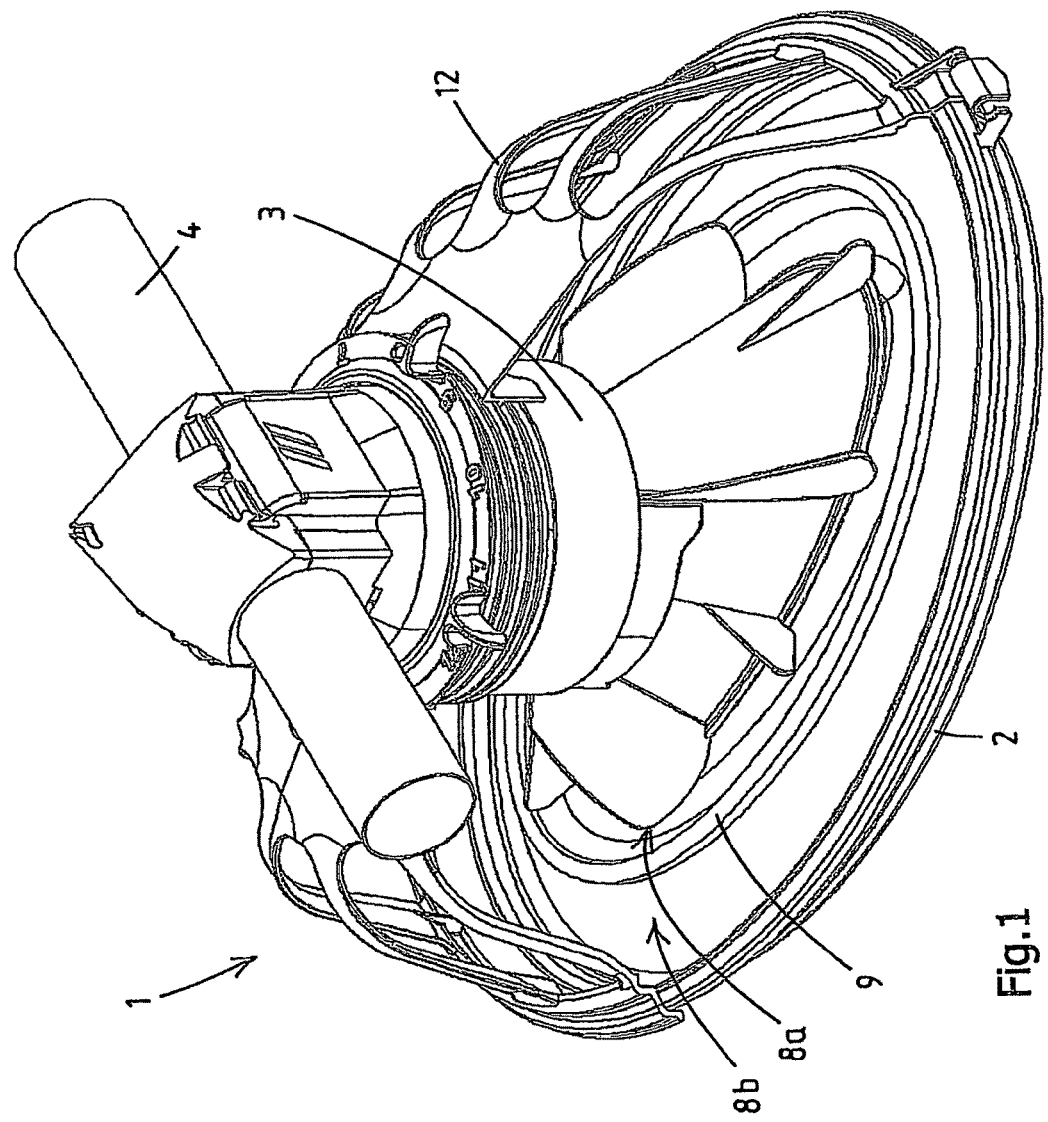
FIG. 1 is an elevation in perspective of an embodiment of a feed dispenser according to the invention.
Figure 2:
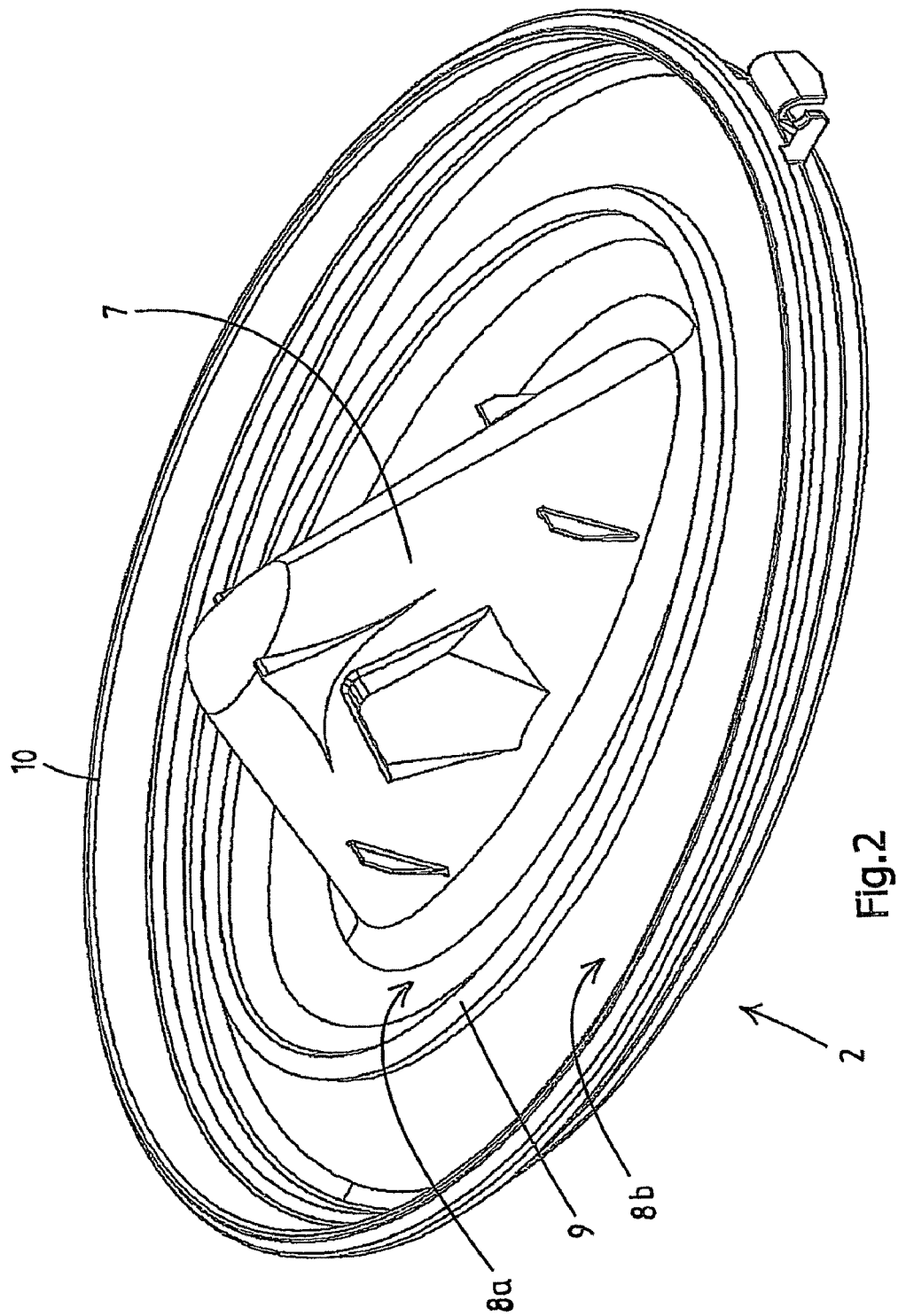
FIG. 2 is an elevation in perspective of the dispensing pan shown in FIG. 1.

In FIG. 1 the entire feed dispenser is denoted with reference numeral 1. The feed dispenser 1 comprises a dispensing pan 2 surmounted by a substantially vertically-oriented drop tube 3. The proximal end of the drop tube 3 is connected to a discharge opening of a feed transport pipe 4. The distal section of the drop tube 3 will usually be flared and located above the central part of the dispensing pan 2. The drop tube 3 works in conjunction with the raised mid-section 7 of the dispensing pan 2 (see FIG. 2). In particular, an opening is created between the drop tube 3 and the raised mid-section 7 that enables feed to move to the bottom area of the dispensing pan 2. The drop tube 3 is adjustable, so that feed can be offered at various heights in the dispensing pan 2. The raised mid-section 7 joins to a base plate 8 which is shown here with an inner trough 8a and an outer trough 8b. The troughs 8a, 8b are separated from each other by a raised section of the base plate 9. The inner trough 8a is also referred to here as the pecking area, by which it is meant the zone of the base plate 8 where the animals are accustomed to finding feed supplied via the drop tube 3. The outer circumference of the base plate 8 is formed into a raised and outwardly tapered sidewall 10.

The grid 12 is connected to the top rim of the side wall 10 of the dispensing pan 2 by a clip. The dispensing pan 2 is suspended from the feed transport pipe 4 via the grid 12 and the drop tube 3.

The dispensing pan 2 is largely manufactured from a plastic base material, for example polypropylene.

Figure 3:
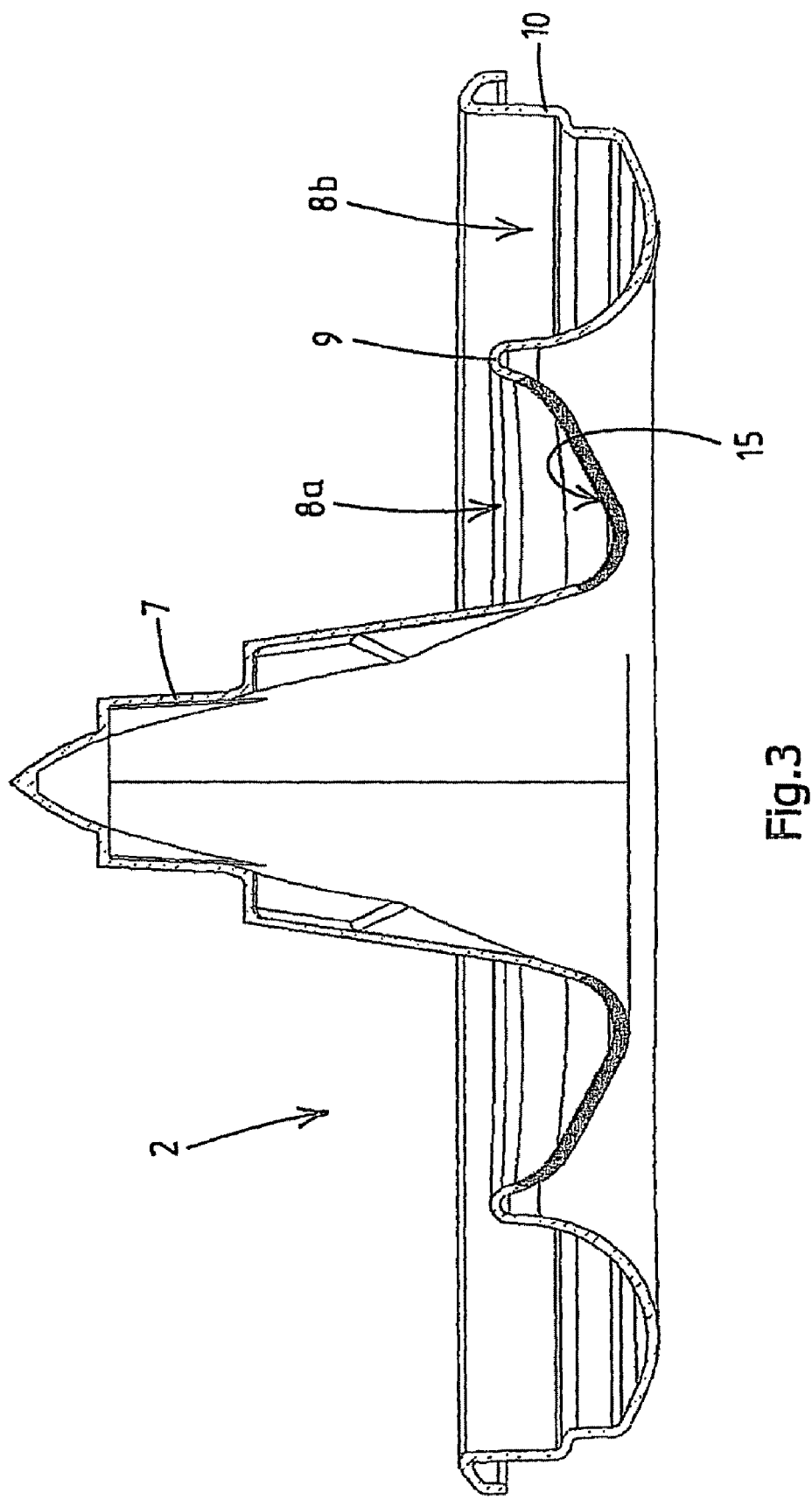
FIG. 3 is an elevation in cross-section of FIG. 2.

According to the invention the base plate of the dispensing pan at the location of trough 8a is manufactured from an impenetrable continuous layer 15 of a material which is more wear-resistant than polypropylene. The layer 15 has a smooth and non-abrasive surface, and surrounds the entire raised mid-section 7 of the dispensing pan 2. In FIG. 3 this layer is manufactured from a plastic material that is more wear-resistant than the plastic base material used to manufacture the remainder of the dispensing pan 2, for example POM, PA, ABS, PC or PU.

The resultant dispensing pan built up from two different plastics is advantageously manufactured using a two-component injection-moulding process, whereby either the plastic base material or the more wear-resistant plastic material is injection-moulded in a mould cavity, the cavity in the mould is changed mechanically, and the other plastic material is injection-moulded. If so required the pan may undergo a finishing treatment, for example a surface treatment. A variant is also possible in which a separate second forming mould is used. The previously manufactured part of the dispensing pan is inserted in this second forming mould and the other plastic material is injection-moulded. The two-component injection-moulding process results in a reliable, firm joint between the two components.

Figure 4:
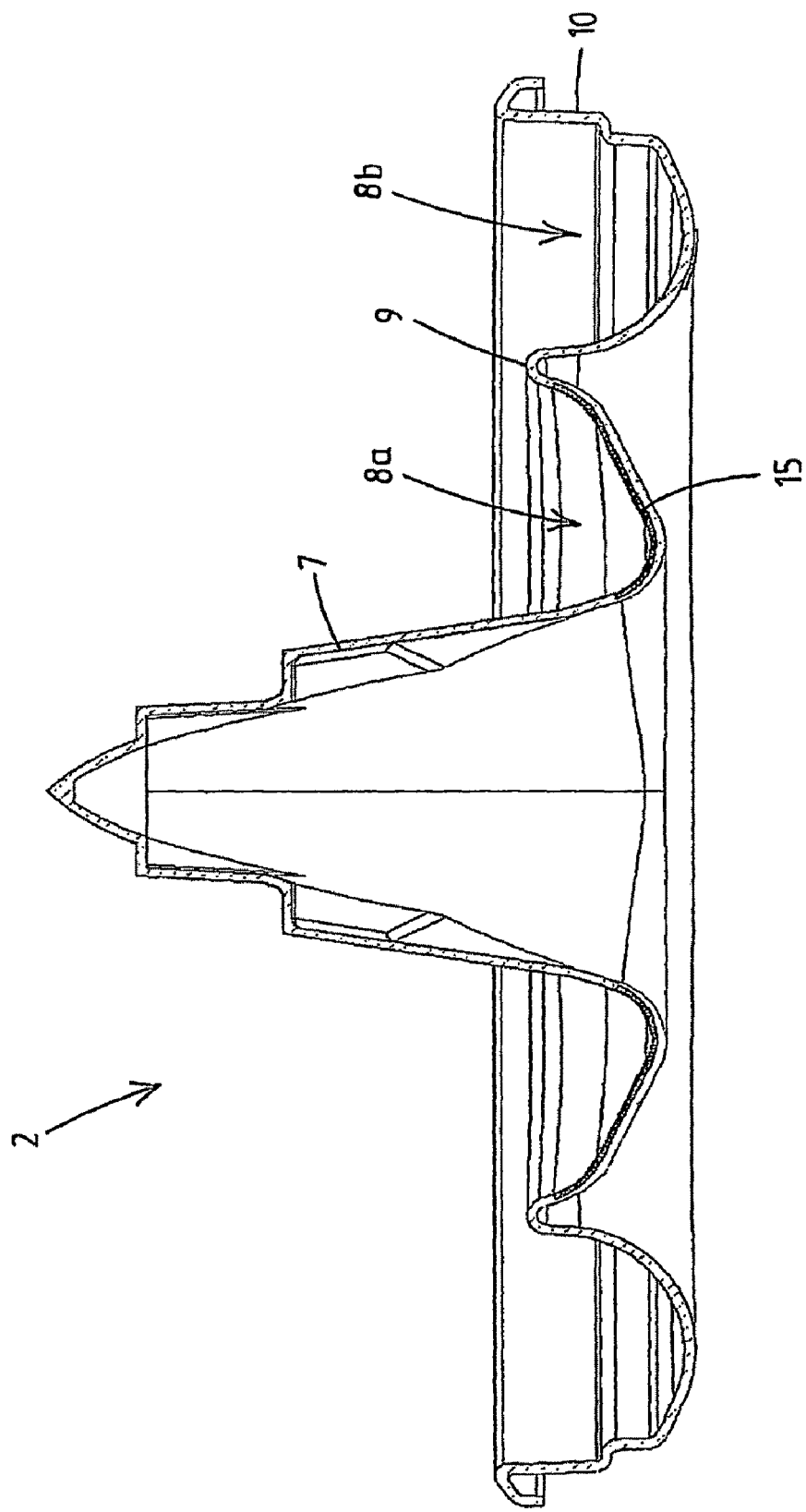
FIG. 4 shows a variant of FIG. 3.

FIG. 4 shows a variant wherein the pecking area at the location of the trough 8a is once again provided with an impenetrable continuous layer 15. However, the layer 15 is now injection-moulded with the plastic base material at a number of locations to form a dispensing pan with local double layers. The advantage of this method is that both layers will be anchored in a strongly mechanical joint, and will support each other since a form of lattice is achieved. The layer 15 is once again manufactured from a more wear-resistant plastic material than the base material. It is also certainly possible that the layer comprises a more wear-resistant insert piece, possibly pre-formed, for example a metal insert piece. The plastic base material is then injection-moulded onto this insert piece.

Figure 5:
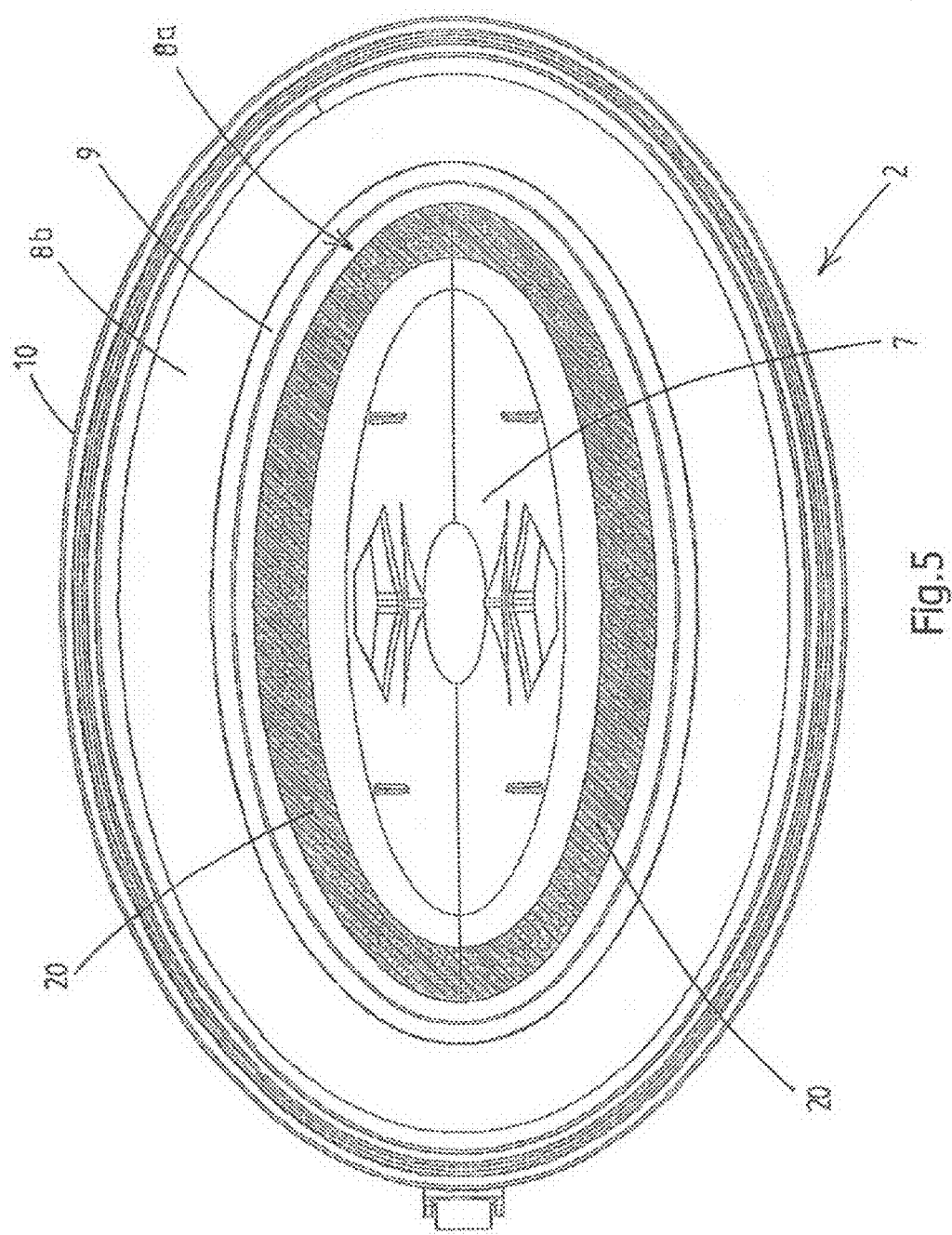
FIG. 5 shows a top view of a further variant of the dispensing pan.

FIGS. 5 and 6 show a variant which provides for two metal insert pieces 20 at the location of the pecking area in the inner trough 8a. This relates to two flat ring segments that are continuous with each other and surround the entire raised mid-section 7. As shown in FIG. 6, the underside as well as the inner and outer circumferences of the insert pieces 20 is embedded in the plastic base material, while the upper surface is free. This offers the advantage that the metal ring segments are firmly anchored and that the chickens will peck directly on the metal. It is also possible that in a variant the entire insert pieces, by which is meant inclusive of the upper surfaces, are embedded in the plastic base material. This variant is also preferably obtained by using an injection-moulding process in which the insert pieces 20 are placed in a forming mould and the plastic base material is then injection-moulded onto the insert pieces. After curing the dispensing pan 2 is obtained.

Many other variants are possible alongside the embodiments shown in the drawings. For example, the dispensing pan may be of a different form, such as a circular shape and/or with only one trough. It is also possible that the entire pecking area or even the entire base plate is provided with an impenetrable continuous layer which in combination with the plastic base material jointly forms the dispensing pan. However, from a cost perspective the continuous layer will preferably be provided solely where strictly necessary, by which is meant the location at which the animals are accustomed to peck at the feed. In addition, the impenetrable layer can also be manufactured from other materials, for example aluminium or stainless steel. As an alternative to an injection-moulding process, the impenetrable continuous layer can also be connected to the plastic base material using another method, for example a mechanical connection such as a screwed connection or a clipped connection, with an adhesive, or by welding.

According to the invention this provides for an animal-friendly, hygienic dispensing pan with a pecking area that has an appropriate resistance to frequent pecking by birds with sharp beaks.

The invention claimed is:

1. A feed dispenser for feeding birds comprising:
a central drop tube;
a dispensing pan which is suspended below the drop tube and which has a based plate and a central mid-section, which central mid-section is raised relative to a base plate, which raised central mid-section is surrounded by the base plate, and which raised central mid-section is positioned in relation to the central drop tube and works in conjunction with the central drop tube such that a volume of feed transported by the drop tube to the dispensing pan is distributed over the base plate of the dispensing pan, in which the base plate is made of a plastic base material having a top surface and a wear-resistant material joined integrally to the top surface of the plastic base material,
wherein the wear-resistant material forms an impenetrable and continuous layer to protect the base plate from perforation caused by a bird's beaks.

2. A feed dispenser according to claim 1 wherein the said impenetrable and continuous layer has a smooth surface.

3. A feed dispenser according to claim 1 wherein the said impenetrable and continuous layer has a non-abrasive surface.

4. A feed dispenser according to claim 1 wherein the said impenetrable and continuous layer is an injection molded component of the dispenser molded along with the plastic base material.

5. A feed dispenser according to claim 1 wherein the said impenetrable and continuous layer surrounds the entire raised mid-section of the dispensing pan.

6. A feed dispenser according to claim 1 wherein the said impenetrable and continuous layer is manufactured from a material that is harder or tougher than the plastic base material.

7. A feed dispenser according to claim 1 wherein the said impenetrable and continuous layer is manufactured from a plastic material.

8. A feed dispenser according to claim 7 wherein both the plastic base material and the impenetrable and continuous layer are manufactured by and joined to each other using an injection-moulding process.

9. A feed dispenser according to claim 8 in which either the plastic base material or the impenetrable and continuous layer is injection-moulded onto the other.

10. A feed dispenser according to claim 1 wherein the said impenetrable and continuous layer is manufactured from a metal.

11. A feed dispenser according to claim 10 wherein the said impenetrable and continuous layer comprises a metal plate element.

12. A feed dispenser according to claim 11 wherein the said metal plate element is profiled in accordance with the profile of the base plate.

13. A feed dispenser according to claim 1 wherein a double layer is formed from at least a part of the said impenetrable and continuous layer and the plastic base material.

14. A feed dispenser according to claim 1 wherein the said impenetrable and continuous layer is at least in part provided as a single layer.

15. A feed dispenser according to claim 1 wherein the said impenetrable and continuous layer is at least in part provided at the location of an intended pecking area.

16. A feed dispenser according to claim 1 wherein the said base plate is formed into an at least partially raised outwardly tapered sidewall.

17. A method for the manufacture of a feed dispenser according to claim 1, including the step of joining the impenetrable and continuous layer to the plastic base material by an injection-moulding process.

* * * * *